(12) United States Patent
Matsumoto et al.

(10) Patent No.: US 6,860,307 B1
(45) Date of Patent: Mar. 1, 2005

(54) PNEUMATIC TIRE AND A PROCESS FOR MOUNTING THE TIRE ONTO VEHICLE

(75) Inventors: Hiroyuki Matsumoto, Kodaira (JP); Daisuke Maehara, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/558,334

(22) Filed: Apr. 26, 2000

(30) Foreign Application Priority Data

Apr. 27, 1999 (JP) .......................... 11-119601
Apr. 13, 2000 (JP) ........................ 2000-111842

(51) Int. Cl.[7] .................. B60C 3/06; B60C 5/00; B60C 13/00; B60C 15/00; B60C 15/06
(52) U.S. Cl. .............. 152/455; 152/539; 152/542; 152/543; 152/555
(58) Field of Search ................ 152/455, 456, 152/543, 555, 542, 539

(56) References Cited

U.S. PATENT DOCUMENTS 3,339,610 A * 9/1967 Fausti et al. ............... 152/455
3,536,118 A   10/1970 Boileau
5,620,538 A * 4/1997 Oshima .................. 152/455 X

FOREIGN PATENT DOCUMENTS

| GB | 1115834   | * | 5/1968  | ............ 152/455 |
| JP | 53040903 A | * | 4/1978  | ............ 152/456 |
| JP | 59081207 A | * | 5/1984  | ............ 152/455 |
| JP | 59081208 A | * | 5/1984  | ............ 152/455 |
| JP | 62071707 A | * | 4/1987  | ............ 152/455 |
| JP | 5-319036  |   | 12/1993 |                     |

OTHER PUBLICATIONS

Burton, Walter E. The Story of Tire Beads and Tires. New York, McGraw–Hill Book Company, Inc., 1954. pp. 5, 99, and 100.*
Patent Abstracts of Japan, 11321245, vol. 2000, No. 02, Nov. 24, 1999, ToyoTire+Rubber Co. Ltd.

* cited by examiner

*Primary Examiner*—Adrienne C. Johnstone
(74) *Attorney, Agent, or Firm*—Sughrue Mion, PLLC

(57) ABSTRACT

A pneumatic tire comprises a tread portion, a pair of sidewall portions, a pair of bead portions, a carcass, a belt, and a reinforcing member arranged in a tire zone including at least the sidewall portion, wherein a shearing rigidity in the circumferential direction of the reinforcing member is made larger at a first tire zone located at an outside of the vehicle than at a second tire zone located at an inside of the vehicle in the same tire at a posture of mounting the tire onto a vehicle.

8 Claims, 6 Drawing Sheets

# PNEUMATIC TIRE AND A PROCESS FOR MOUNTING THE TIRE ONTO VEHICLE

BACKGROUND OF THE INVENTION

1. Field of the Invention

This invention relates to a pneumatic tire capable of improving a braking performance in a vehicle, particularly a stability of vehicle posture in the sudden braking and a process for mounting such a tire onto the vehicle.

2. Description of Related Art

In order to meet a social demand for more improving safety performances of the vehicle, ABS (antilock braking system or a system for preventing the wheels from locking in the sudden braking) tends to be mounted onto recent vehicles, whereby an action of avoiding danger can be carried out even in the sudden braking.

On the other hand, the braking performance of the vehicle is largely influenced by performance of the tire as a contact point between the road surface and the vehicle, so that various studies have been made for improving the braking performance in the tire. However, it is an actual state that the braking performance inherent to the tire does not reach to a satisfactory level including the stability of vehicle posture in the sudden braking.

Nowadays, there is increased a chance of running the vehicle at higher speed under a background that networks of expressways are advanced and the power of the vehicle is increased, so that it is strongly desired to develop tires capable of effectively preventing the change of the vehicle posture even if the sudden braking is carried out during the high-speed running.

SUMMARY OF THE INVENTION

It is, therefore, an object of the invention to provide a high-performance pneumatic tire capable of effectively improving the braking performance of the vehicle, particularly the stability of vehicle posture in the sudden braking suddenly and a process for mounting such a tire onto the vehicle.

According to a first aspect of the invention, there is the provision of in a pneumatic tire comprising a tread portion, a pair of sidewall portions extending inward from both side parts of the tread portion in a radial direction, a bead portion continuously connected to an inner end of the sidewall portion in the radial direction, a carcass reinforcing these portions, a belt arranged on an outer circumferential side of a crown portion of the carcass, and a reinforcing member arranged in a tire zone including at least each of the sidewall portions, preferably a tire zone ranging from the bead portion to the sidewall portion, an improvement wherein a shearing rigidity of the reinforcing member in the circumferential direction, which serves to apply a braking force to the tire, arranged in the same tire at a posture of mounting the tire onto a vehicle is made larger at a first tire zone located at an outside of the vehicle than at a second tire zone located at an inside of the vehicle among the above tire zones.

In such a tire, the shearing rigidity in the circumferential direction in the application of the braking force is higher in the sidewall portion located at the outside of the vehicle than in the sidewall portion located at the inside of the vehicle, so that the shearing deformation amount of the sidewall portion located at the inside of the vehicle becomes larger than that of the sidewall portion located at the outside of the vehicle in the application of the braking force to the tire and the ground contact area of the tread portion is larger in a part of the tread portion located at the inside of the vehicle than that in a part located at the outside of the vehicle. Thus, right- and left-wheeled tires symmetrically arranged on both side of the vehicle with respect to a center line in a widthwise direction thereof create a force of intending to change into an inward direction based on a difference of frictional force between the tire and the road surface in addition to a difference of rotating radius necessarily caused in the braking of the tire. However, such a force is usually offset by the interaction between the left and right tires, and as a result, the occurrence of yaw moment around the center of gravity in the vehicle is effectively controlled to sufficiently prevent the disorder of the vehicle posture in the braking. The term "yaw moment" used herein means a moment of yawing around a straight line perpendicular to the road surface among the yawings caused in the vehicle running along the road surface.

And also, when such tires are mounted onto the vehicle, the left- and right-wheeled tires symmetrically located on both sides of the vehicle with respect to the center line in the widthwise direction thereof are preferable to be arranged so that the reinforcing members arranged in the first and second tire zones are symmetrical with each other in the left and right tires with respect to the above center line.

In this way, absolute values of the forces changing into the inward direction created in the left- and right-wheeled tires are substantially made equal, whereby the disorder of the vehicle posture in the braking of the vehicle is more effectively prevented.

And also, it is preferable that the reinforcing member arranged in the tire zone is comprised of at least one rubberized cord reinforcing layer, wherein at least one of the number, width, cord stiffness and end count in the cord reinforcing layer as the reinforcing member arranged in the first tire zone is made larger than the respective one in the cord reinforcing layer as the reinforcing member arranged in the second tire zone in the same tire.

Further, the reinforcing member is preferable to be comprised of plural reinforcing layers, cords of which layers being crossed with each other. Furthermore, at least one reinforcing layer among the reinforcing layers constituting the reinforcing member is preferable to be a turn-up reinforcing layer wound around the bead core from an inside toward an outside in the widthwise direction of the tire.

Moreover, it is more favorable that a cord extending direction of at least one of a reinforcing layer located at an innermost side in the widthwise direction of the tire and a width-widest reinforcing layer among the plural reinforcing layers constituting the reinforcing member is upward to the right in the left-wheeled tire and upward to the left in the right-wheel tire as the reinforcing members arranged in the first and second tire zones viewing a plan of the tire mounted onto the vehicle at its phantom developed state from a ground contact side of the tread portion when a forward running direction of the vehicle is upward. Moreover, when the reinforcing layer aiming at the limitation of the above cord extending direction; corresponds to both the reinforcing layer located at the innermost side in the widthwise direction of the tire and the width-widest reinforcing layer, it is preferable to preferentially apply the above cord extending direction to the width-widest reinforcing layer.

Thus, when braking force is applied to the left- and right-wheeled tires, viewing the cord extending directions of the reinforcing layers in the respective tire zones of each of both the tires, each cord acts to develop a high resistance to tension against the shearing force in the circumferential direction to effectively restrain the shearing deformation in the first tire zone located at the outside of the vehicle, while the cord extending direction in the second tire zone located at the inside of the vehicle is a direction which can not develop a high resistance to tension against the shearing force in the circumferential. direction and hence the shearing deformation in the circumferential direction is hardly restrained by the cords of the reinforcing layer.

In the pair of left- and right-wheeled tires, therefore, the second tire zone is largely subjected to the shearing deformation in; the circumferential direction rather than the first tire zone, so that the ground contact area of the tread portion in each of both the tires becomes larger in a part located at the inside of the vehicle than that in a part located at the outside thereof as mentioned above, whereby forces changing in the inward direction to be offset each other are created in both the tires.

By the way, it is favorable to apply the above cord extending direction of the reinforcing layer to at least one of the reinforcing layer located at the innermost side of the in the widthwise direction (hereinafter abbreviated as the innermost reinforcing layer) and the width-widest reinforcing layer because the tension in the reinforcing layer is higher at the inner layer side than at the outer layer side and the effect of the cord extending direction is particularly large, and also the acting range becomes wider in the width-wide reinforcing layer and the aforementioned function can be developed in many cords of such a reinforcing layer.

Moreover, in case of arranging one or more turn-up reinforcing layers wound around the bead core, a portion of the turn-up reinforcing layer located at the innermost side in the widthwise direction of tire is the innermost reinforcing layer. Because, the strength in the turn-up reinforcing layer wound around the bead core is increased by turning to enhance the reinforcing effect. Therefore, when the turn-up reinforcing layer is arranged so as to render into an inner layer, the reinforcing effect is more enhanced by the synergistic action with the above tension increasing effect.

When the reinforcing layer is arranged so as to turn around the bead core, it is preferable that the reinforcing layers are arranged so as to cross cords of these layers with each other in portions other than the turnup portion of the turn-up reinforcing layer turned outward in the widthwise direction of the tire for increasing the reinforcing: effect through crossing of the cords.

According to a second aspect of the invention, there is the provision of a process for mounting a pneumatic tire onto a vehicle, said tire comprising a tread portion, a pair of sidewall portions extending inward from both side parts of the tread portion in a radial direction, a bead portion continuously connected to an inner end of the sidewall portion in the radial direction, a carcass reinforcing these portions, a belt arranged on an outer circumferential side of a crown portion of the carcass, and a reinforcing member arranged in a tire zone including at least each of the sidewall portions, preferably a tire zone ranging from the bead portion to the sidewall portion, wherein a shearing rigidity of the reinforcing member in the circumferential direction, which serves to apply a braking force to the tire, arranged in the same tire at a posture of mounting the tire onto a vehicle is made larger at a first tire zone located at an outside of the vehicle than at a second tire zone located at an inside of the vehicle among the above tire zones, characterized in that the tires having the above construction are mounted onto the vehicle on left and right sides with respect to a center line of the vehicle in a widthwise direction thereof so that the reinforcing members arranged in the first tire zone and second tire zone are symmetrical with each other in both the tires with respect to the above center line.

According to the invention, the stability of vehicle posture in the braking can advantageously be improved because the shearing rigidities in the circumferential direction of the respective tire zones are made substantially symmetrical in the pair of left- and right-wheeled tires with respect to the center line of the vehicle in the widthwise direction to sufficiently equalize forces changing in the. inward direction created in the pair of the left- and right-wheeled tires and effectively offset such forces.

BRIEF DESCRIPTION OF THE DRAWINGS

The invention will be described with reference to the accompanying drawings, wherein.

DESCRIPTION OF THE PREFERRED EMBODIMENTS

Figure 1:
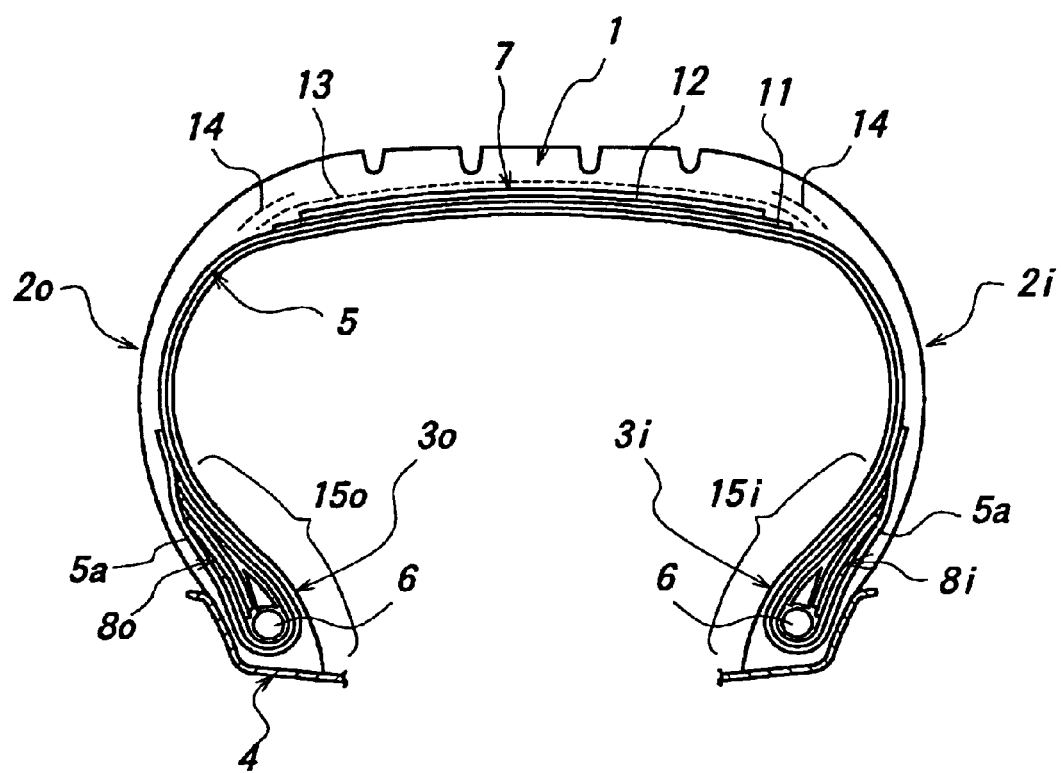
FIG. 1 is a diagrammatically section view of an embodiment of the pneumatic tire according to the invention at a state of being mounted onto a rim.

In FIG. 1 is shown a diagrammatically section view of an embodiment of the pneumatic tire according to the invention at a state of being mounted onto a rim, in which numeral 1 is a tread portion, numerals 2$i$ and 2$o$ sidewall portions extending inward from the both sides of the tread portion 1 in a radial direction, numerals 3$i$ and 3$o$ bead portions continuously connected to inner ends of the sidewall portions 2$i$, 2$o$ in the radial direction, and numeral 4 a wheel rim seated with the bead portions 3$i$, 3$o$.

Moreover, these portions 1, 2, 3 are reinforced between bead cores 6 embedded in the respective bead portions 3$i$, 3$o$ by a carcass 5 comprised of at least one ply containing organic fiber cords such as polyester cords, nylon cords and the like arranged in the radial direction, while each side portion of the carcass 5 is wound and fixed around the bead core 6 upward in the radial direction. And also, the tread portion 1 is reinforced with a belt 7 superposed on an outer peripheral side of a crown portion of the carcass 5.

For example, as shown in FIG. 1, the belt 7 is comprised of two cross steel cord layers 11 and 12, a wide-width layer or so-called cap member 13 arranged on an outer circumference side and formed by spirally winding an organic fiber cord, and a narrow-width layer or so-called layer member 14 arranged at each side portion of the cap member 13 on an outer circumference side thereof and formed by spirally winding an organic fiber cord. However, the structure of the belt such as the arranging number of these layers 11–14 and the like can properly be changed in accordance with the use purpose.

In the invention, when the mounting posture of the tire onto the vehicle is specified, a shearing rigidity of the reinforcing member 8o in the circumferential direction, which serves to apply a braking force to the tire, arranged at a first tire zone including the sidewall portion 2o located at the outside of the vehicle (hereinafter abbreviated as first tire zone), in a first tire zone 15o ranging from the bead portion 3o to the sidewall portion 2o in FIG. 1 is made larger than a shearing rigidity of the reinforcing member 8i in the a circumferential direction similarly arranged at a second tire zone 15i including the sidewall portion 2i located at the inside of the vehicle (hereinafter abbreviated as second tire zone).

In this case, the above difference of the shearing rigidity in the circumferential direction can be realized, for example, by such a construction that when each of the reinforcing members 8i, 8o arranged in the respective tire zones 15i, 15o is comprised of at least one rubberized cord reinforcing layer (three reinforcing layers 10a–10c in FIG. 1) in the same tire, at least one of the number, width, cord stiffness and end count in the reinforcing layer 10a–10c as the reinforcing member 8o arranged in the first tire zone 15o is made larger than the respective one in the reinforcing layer 10a–10c as the reinforcing member 8i arranged in the second tire zone 15i.

Figure 2:
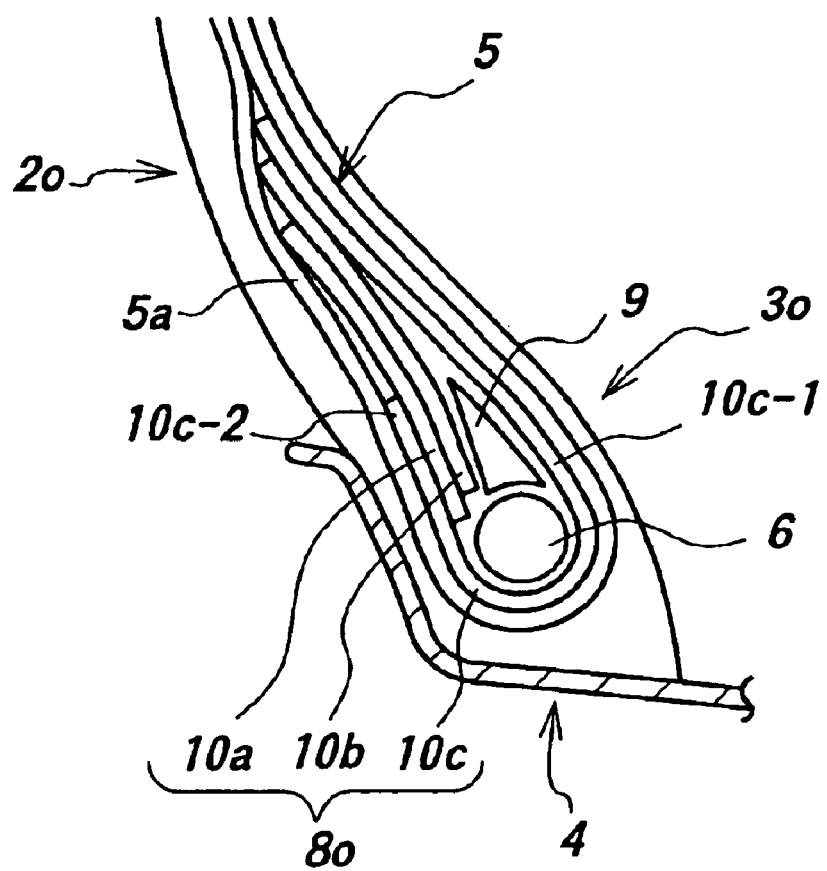
FIG. 2 is a diagrammatically enlarged section view of a main part of the tire shown in FIG. 1.

More particularly, as the main part of the tire of FIG. 1 is enlargedly and sectionally shown in FIG. 2, when the reinforcing member 8o in the first tire zone 15o located at the outside of the vehicle is comprised of two reinforcing layers 10a, 10b arranged between a bead filler 9, which is arranged on an outer peripheral side of the bead core 6 and gradually decreases its thickness outward in the radial direction, and a turnup portion 5a of the carcass 5 and a turn-up reinforcing layer 10c wound around the bead core 6 from an inside of the tire toward an outside thereof in the widthwise direction, the shearing rigidity in the circumferential direction of the reinforcing member 8o at the first tire zone 15o can expectedly be increased as compared with that of the reinforcing member 8i at the second tire zone 15i by decreasing at least one of the number, width, cord stiffness and end count in the reinforcing layer 10a–10c as the reinforcing member 10a–10c as the reinforcing member 8i at the second tire zone 15i located at the inside of the vehicle as compared with that as shown in FIG. 2.

Moreover, the term "width of the reinforcing layer" used herein means a width of the reinforcing layer as measured along the reinforcing layer in a section of the tire (a length in section).

Alternatively, when the bead filler 9 contributing to reinforce the bead portion 3i, 3o of the tire is arranged so as to extend up to the sidewall portion 2i, 2o, the required rigidity difference can be realized by adjusting at least one of rubber hardness, rubber gauge and extending length in the radial direction of the bead filler 9 in place of the above construction or in addition to the above construction.

Now, when each of the reinforcing members 8o, 8i is comprised of plural reinforcing layers 10a–10c as shown in FIG. 2, in order to make more effective the reinforcing action, it is preferable that at least one reinforcing layer 10c among these layers is a turn-up reinforcing layer wound around the bead core 6 from the inside toward the outside in the widthwise direction of the tire and that the cords are crossed with each other between the reinforcing layers 10a–10c.

Moreover, when the cords of the reinforcing layers 10a–10c are crossed with each other as mentioned above, if the cord extending direction of one or more reinforcing layers 10a–10c wound around the bead core 6 obstructs the desired cord crossing between the layers in connection with the arranging number of the reinforcing layers 10a–10c and the like, it is preferable to cross cords in a portion 10c-1 of the turn-up reinforcing layer 10c excluding a turnup portion 10c-2 wound outward in the widthwise direction of the tire with cords of the reinforcing layers 10a, 10b in order to more strongly develop the reinforcing action.

Figure 3A:
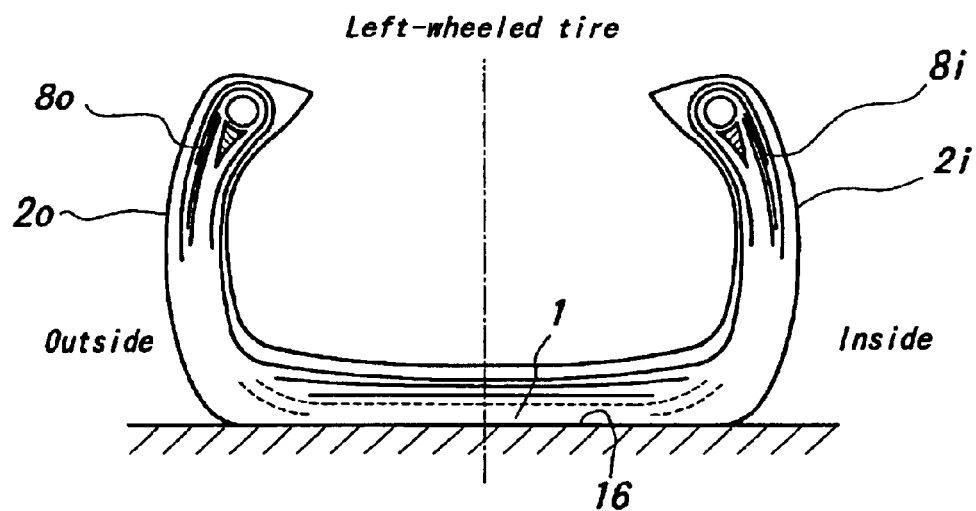
FIGS. 3a and 3b are diagrammatical views illustrating a state of creating a force changing into an inward direction in a left-wheeled tire, respectively.
Figure 3B:
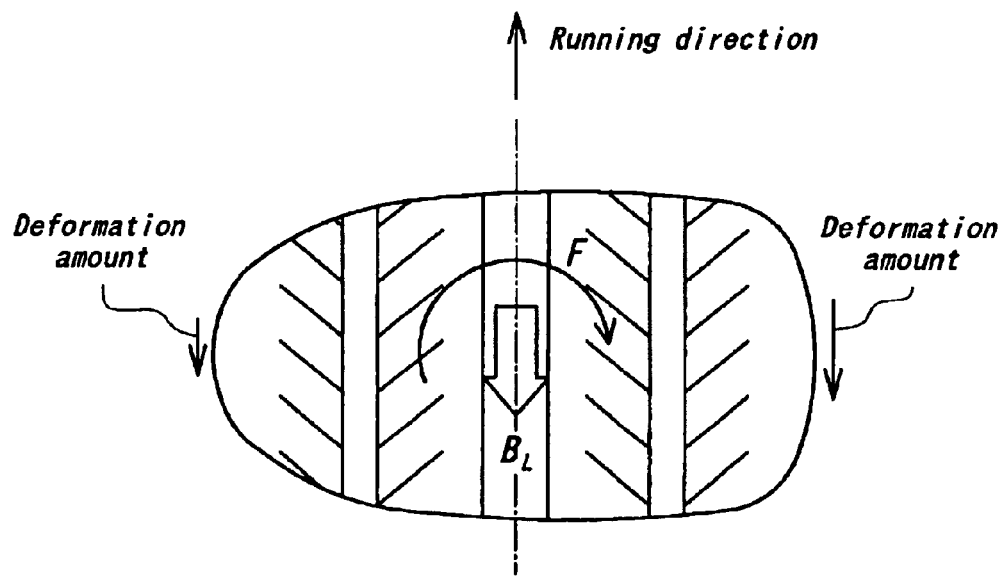

When the shearing rigidity in the circumferential direction of the reinforcing member 8o in the first tire zone 15o located at the outside of the vehicle for the input of the braking force is made larger than that of the reinforcing member 8i in the second tire zone 15i located at the inside of the vehicle as mentioned above, viewing the behavior of the left-wheeled tire in the action of the braking force to the tire as shown in FIG. 3a, the first tire zone 15o located at the outside of the vehicle develops a high rigidity to a braking force $B_L$ and slightly deforms in the circumferential direction, while the second tire zone 15i located at the inside of the vehicle is subjected to a large shearing deformation in the circumferential direction, whereby the ground contact shape of the tread portion 1 and hence the ground contact area is made larger at the inner portion of the vehicle than that at the outer portion thereof as shown in FIG. 3b, and the rotating radius of the tire becomes smaller at the inner side of the vehicle than that at the outer side thereof, and the friction force between the tread portion 1 and the road surface 16 becomes larger at the inner side of the vehicle than that at the outer side thereof. As a result, a force F changing a forward side of the tire toward the inside of the vehicle is created in the tire.

However, such a changing force F is offset by an opposite changing force similarly created in the right-wheeled tire, so that the vehicle can hold a sufficiently stable posture even in the braking.

This is especially remarkable when the absolute value of the changing force F is made equal in the left- and right-wheeled tires by rendering the reinforcing members 8o, 8i arranged in the first and second tire zones 15o, 15i into symmetry with respect to the center a line of the vehicle in the widthwise direction in the left- and right-wheeled tires symmetrically located at both sides of the vehicle with respect to the center line.

Figure 4:
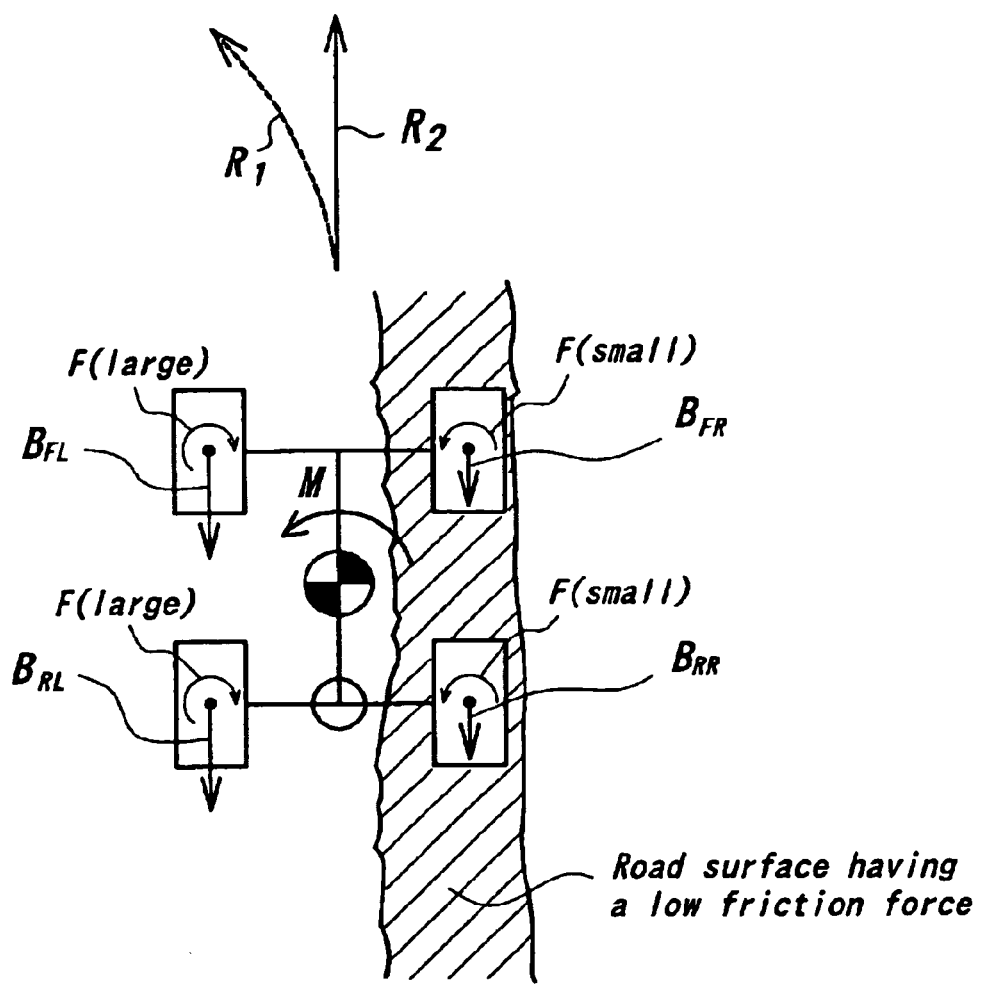
FIG. 4 is a diagrammatical view illustrating a state of creating yaw moment M when four tires are mounted onto a vehicle.

In case of mounting the respective tires having the above construction onto the vehicle as shown by a schematically plan view in FIG. 4, when the braking force is applied to the vehicle, for example, under a condition that front- and rear-wheeled tires located at the left side of the vehicle are existent on a usual paved road surface and front- and rear-wheeled tires located at the right side of the vehicle are existent on a road surface having a low friction force such as a pool, a frozen road or the like, the braking forces $B_{FR}$, $B_{RR}$ acting to the front- and rear-wheeled tires at the right side become smaller than the braking forces $B_{FL}$, $B_{RL}$ acting to the front- and rear-wheeled tires at the left side. As a result, even when the vehicle body is usually maintained at a straight running posture, yaw moment M to the left around the centroidal axis of the vehicle in FIG. 4 is created in accordance with the difference of the braking force between the left- and right-wheeled tires and hence the running direction of the vehicle changes into a left direction shown by a long arrow of a broken line $R_1$ in FIG. 4.

In the pneumatic tires according to the invention, however, each of these tires creates an inward changing force F in accordance with the magnitude of the braking force applied to such a tire. The inward changing force F is larger in the front- and rear-wheeled tires at the left side than in the front- and rear-wheeled tires at the right side, so that the yaw moment M necessarily created due to the difference between the braking forces applied to the left- and right-wheeled tires is effectively offset by a large inward changing force F created in the left-wheeled tire. As a result, the running direction of the vehicle is sufficiently and stably maintained in the straight running direction shown by a long arrow of a solid line $R_2$ in FIG. 4.

Moreover, when left- and right-wheeled tires, in which the shearing rigidity in the circumferential direction of the reinforcing member 8o arranged in the first tire zone 15o located at the outside of the vehicle against the action of the braking force to the tire is made larger than that of the reinforcing member 8i arranged in the second tire zone 15i located inside the vehicle, are mounted onto the vehicle so as to render the constructions of the reinforcing members 8i, 8o arranged in the tire zones 15i, 15o in both tires into symmetry with respect to the center line of the vehicle in the widthwise direction, the straight running stability in case of applying the braking force on the vehicle is more improved as mentioned above, so that an excellent straight braking performance can be always obtained though the left- and right-wheeled tires are located on the road surface of the same condition or different condition.

Figure 6:
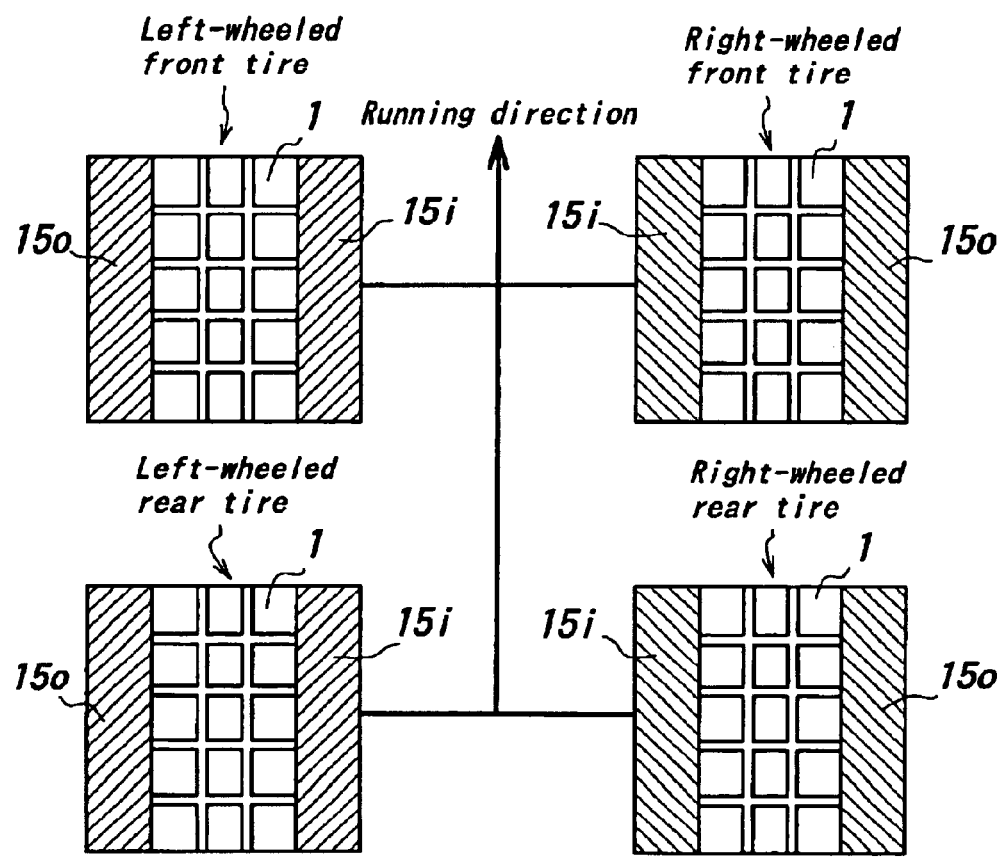
FIG. 6 is a diagrammatically plan view of a phantom developed state of four tires mounted onto a vehicle viewing from a ground contact side of a tread portion when a forward running direction of the vehicle is upward.

And also, the desired difference of the shearing rigidity in the circumferential direction between the reinforcing members 8i, 8o arranged in the tire zones 15i, 15o can be attained by specifying the cord extending direction in the reinforcing layers 10a–10c in place of or in addition to the construction mentioned above. In this case, it is preferable that the cord extending direction of at least one of an innermost reinforcing layer and a width-widest reinforcing layer among the reinforcing layers 10a–10c constituting the reinforcing members 8i, 8o arranged in the tire zones 15i, 15o is upward to the right in the left-wheeled tire and upward to the left in the right-wheel tire as the reinforcing members arranged in the first and second tire zones 15o, 15i viewing a plan of the tire mounted onto the vehicle at its phantom developed state from a ground contact side of the tread portion when a forward running direction of the vehicle is upward (see FIG. 6).

Figure 5:
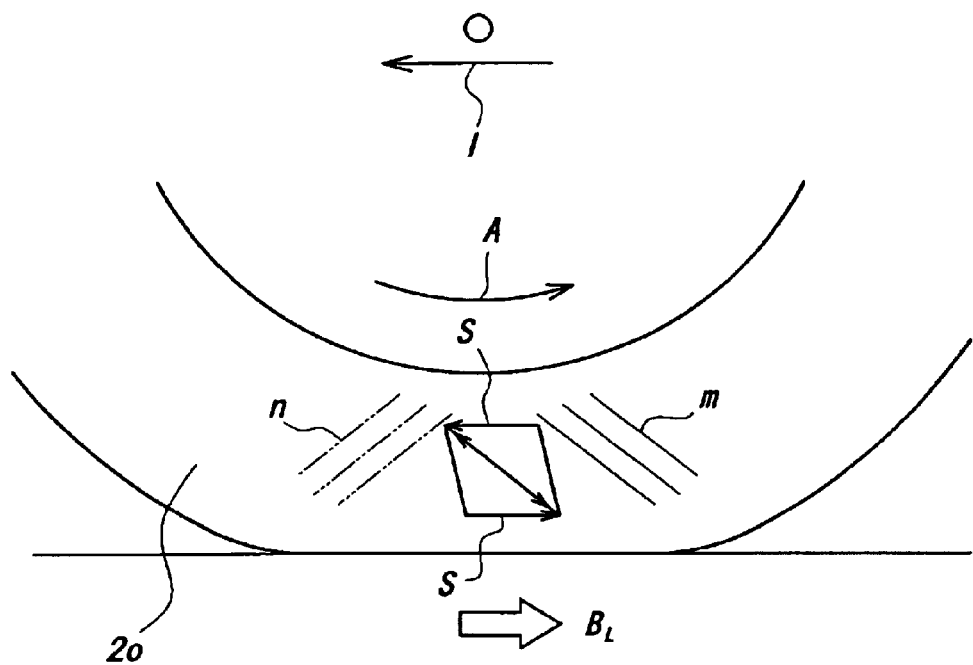
FIG. 5 is a schematically partial side view of a left-wheeled tire illustrating an influence of a cord extending direction of a reinforcing layer.

In FIG. 5 is shown a side view of the left-wheeled tire (a part thereof) viewed from the outside of the vehicle during the running of the tire, in which a fine line m is a cord extending direction in the reinforcing layer constituting the reinforcing member 8o arranged in the first tire zone 15o and a phantom line n is a cord extending direction in the reinforcing layer constituting the reinforcing member 8i arranged in the second tire zone 15i.

When a braking force $B_L$ is applied to the tire bringing about a forward running of the vehicle by anti-clockwise rotation (direction shown by an arrow A in FIG. 5), shearing force S in the circumferential direction is caused in the tire zones 15i, 15o under a relation between the braking force $B_L$ and inertial force I of the vehicle. With respect to such a shearing force S and hence a main tensile direction resulted from the occurrence of the shearing force S, the cords of the reinforcing layer arranged in the first tire zone 15o (see the fine line m in FIG. 5) develop tension resistance inherent thereto in relation with the cord extending direction and function so as to restrain the shearing deformation in the circumferential direction at the first tire zone 15o, while the cords of the reinforcing layer arranged in the second tire zone 15i (see the phantom line n in FIG. 5) can not effectively develop the supporting function of the shearing force S and hence the relatively large shearing deformation in the circumferential direction is caused in the second tire zone 15i and consequently, the inward changing force similar to the case of FIG. 3 is created. Such an inward changing force is advantageously offset by that created in the right-wheeled tire symmetrically located with respect to the center line of the vehicle in the widthwise direction.

Therefore, the required difference of the shearing rigidity in the circumferential direction can be given to the first and second tire zones 15i, 15o by selecting the cord extending direction in the reinforcing layer as mentioned above.

Moreover, when one or more turn-up reinforcing layers 10c wound around the bead core 6 exist in the reinforcing member 8i, 8o, it is preferable that a portion 10c-1 of the turn-up reinforcing layer located at an innermost side in the widthwise direction of the tire is the innermost reinforcing layer for realizing the above cord extending direction. Thus, the strength is increased by such a turning to enhance the reinforcing effect, and also when the portion 10c-1 of the reinforcing layer 10 is arranged so as to form an inner layer, the tension is increased to obtain a more further reinforcing effect.

The following examples are given in illustration of the invention and are not intended as limitations thereof.

There are provided pneumatic radial tires for passenger car having a tire size of 235/45ZR17 as a comparative tire and example tires. In these tires, the ground contact shape and the groove arrangement comply with FIG. 3, and the constructions of the reinforcing members 8o, 8i arranged in the first and second tire zones 15o, 15i are shows in Table. 1.

A carcass 5 is comprised of two plies each containing polyester cords of 1000D/2 therein. A belt 7 comprises two cross steel cord layers 11, 12 each containing steel cords of 1×5 structure arranged at a cord inclination angle of 22° with respect to an equatorial plane of the tire, a cap member 13 containing nylon cords of 1260D/2 , and a pair of layer members 14 containing the same nylon cords.

Moreover, the other construction of the tire is substantially the same as in the usual pneumatic radial tire for passenger car.

(Test Method)

The following test is performed with respect to these tires to evaluate the stability of vehicle posture in sudden braking. And also, the cornering force (CF) is also measured.

As the stability of vehicle posture in sudden braking, the yawing magnitude in yaw direction and the sense of stability to the lateral direction until the vehicle is stopped are evaluated together when each of the tires is mounted onto a test vehicle of rear-wheel-driving system having a displacement of 2500 cc (a domestic sports utility passenger car provided with ABS) and run straight forward at a speed of 120 km/h and suddenly braked while holding a steering wheel at a straightforward running state under a condition of riding two crewmen inclusive of a professional driver. The evaluation results are shown in Table 1. Moreover, the numerical value for the stability in braking in Table 1 is a numerical value when evaluating by ±10 stages in contrast to Comparative Example which is used as a control tire, in which the larger the numerical value at the side of plus (+), the better the stability.

And also, the cornering force (CF) is measured when each of the tires is assembled onto a rim of 8JJ and inflated under an internal pressure of 240 kPa (an internal pressure as measured on the basis of atmospheric pressure) and run on a flat belt type testing machine provided with a safety walk at a speed of 50 km/h under a load of 4410 N corresponding to 69.2% of a maximum load capacity (6370 N) under a condition that a deviation (slip angle) between the running direction and the rotating surface of the tire is 1°. The measured results are also shown in Table 1. Moreover, the numerical value of the cornering force (CF) in Table 1 is represented by an index on the basis that the comparative tire (CF=1.77 kN) is 100, in which the larger the numerical value, the better the cornering property.

As seen from the results of Table 1, the tires of Examples 1–6 are excellent in the stability in braking as compared with Comparative Example and the cornering property thereof is equal to or more than that of Comparative Example.

According to the invention, there can be provided pneumatic tires capable of largely improving the stability of vehicle posture in braking, particularly sudden braking.

What is claimed is:

1. A pair of mounted pneumatic tires on a vehicle, each tire comprising a tread portion, a pair of sidewall portions extending inward from both side parts of the tread portion in a radial direction, a bead portion continuously connected to TABLE 1(a)

| | | | Comparative Example | | | | Example 1 | | | | Example 2 | | | |
|---|---|---|---|---|---|---|---|---|---|---|---|---|---|---|
| | | | A | B | C | D | A | B | C | D | A | B | C | D |
| Left-wheeled tire | Reinforcing member 8o | Reinforcing layer 10a | 50 | 36 | nylon | L42 | 50 | 36 | nylon | R42 | 50 | 36 | nylon | R42 |
| | | Reinforcing layer 10b | 60 | 36 | nylon | R42 | 60 | 36 | nylon | R42 | 60 | 36 | nylon | L42 |
| | | Reinforcing layer 10c 10c-1, 10c-2 | 120 80, 40 | 36 | nylon | L42 | 120 80, 40 | 36 | nylon | R42 | 120 80, 40 | 36 | nylon | R42 |
| | Reinforcing member 8i | Reinforcing layer 10a | 50 | 36 | nylon | L42 | 50 | 36 | nylon | R42 | 50 | 36 | nylon | R42 |
| | | Reinforcing layer 10b | 60 | 36 | nylon | R42 | 60 | 36 | nylon | R42 | 60 | 36 | nylon | L42 |
| | | Reinforcing layer 10c 10c-1, 10c-2 | 120 80, 40 | 36 | nylon | L42 | 120 80, 40 | 36 | nylon | R42 | 120 80, 40 | 36 | nylon | R42 |
| Right-wheeled tire | Reinforcing member 8o | Reinforcing layer 10a | 50 | 36 | nylon | L42 | 50 | 36 | nylon | L42 | 50 | 36 | nylon | L42 |
| | | Reinforcing layer 10b | 60 | 36 | nylon | R42 | 60 | 36 | nylon | L42 | 60 | 36 | nylon | R42 |
| | | Reinforcing layer 10c 10c-1, 10c-2 | 120 80, 40 | 36 | nylon | L42 | 120 80, 40 | 36 | nylon | L42 | 120 80, 40 | 36 | nylon | L42 |
| | Reinforcing member 8i | Reinforcing layer 10a | 50 | 36 | nylon | L42 | 50 | 36 | nylon | L42 | 50 | 36 | nylon | L42 |
| | | Reinforcing layer 10b | 60 | 36 | nylon | R42 | 60 | 36 | nylon | L42 | 60 | 36 | nylon | R42 |
| | | Reinforcing layer 10c 10c-1, 10c-2 | 120 80, 40 | 36 | nylon | L42 | 120 80, 40 | 36 | nylon | L42 | 120 80, 40 | 36 | nylon | L42 |
| Evaluation of tire properties | Cornering property (CF) | | 100 | | | | 103 | | | | 104 | | | |
| | Stability in braking | | control | | | | +2 | | | | +3 | | | |

(Note)
A: width of reinforcing layer (mm), B: end count (cords/50 mm), C: kind of cord, D: extending angle of cord (°)
[L42] in D column: 42° upward to the left, [R42] in D column: 42° upward to the right TABLE 1(b)

| | | | Example 3 | | | | Example 4 | | | | Example 5 | | | | Example 6 | | | |
|---|---|---|---|---|---|---|---|---|---|---|---|---|---|---|---|---|---|---|
| | | | A | B | C | D | A | B | C | D | A | B | C | D | A | B | C | D |
| Left-wheeled tire | | | | | | | | | | | | | | | | | | |
| Reinforcing member 8o | | Reinforcing layer 10a | 50 | 36 | nylon | R42 | 60 | 36 | nylon | R42 | 60 | 36 | nylon | R42 | — | — | — | R42 |
| | | Reinforcing layer 10b | 60 | 36 | nylon | L42 | 70 | 36 | nylon | R42 | 70 | 36 | nylon | R42 | 60 | 34 | steel | R42 |
| | | Reinforcing layer 10c | 120 | 36 | nylon | R42 | 120 | 36 | nylon | R42 | 120 | 36 | nylon | R42 | 120 | 36 | nylon | R42 |
| | | 10c-1, 10c-2 | 80, 40 | | | | 80, 40 | | | | 80, 40 | | | | 80, 40 | | | |
| Reinforcing member 8i | | Reinforcing layer 10a | 50 | 36 | nylon | — | 30 | 36 | nylon | R42 | 40 | 36 | nylon | R42 | — | — | — | R42 |
| | | Reinforcing layer 10b | 60 | 36 | nylon | — | 40 | 36 | nylon | R42 | 50 | 36 | nylon | R42 | 60 | 36 | nylon | R42 |
| | | Reinforcing layer 10c | 120 | 36 | nylon | R42 | 100 | 36 | nylon | R42 | — | — | — | R42 | 100 | 36 | nylon | R42 |
| | | 10c-1, 10c-2 | 80, 40 | | | | 60, 40 | | | | | | | | 60, 40 | | | |
| Right-wheeled tire | | | | | | | | | | | | | | | | | | |
| Reinforcing member 8o | | Reinforcing layer 10a | 50 | 36 | nylon | L42 | 60 | 36 | nylon | L42 | 60 | 36 | nylon | L42 | — | — | — | L42 |
| | | Reinforcing layer 10b | 60 | 36 | nylon | R42 | 70 | 36 | nylon | L42 | 70 | 36 | nylon | L42 | 60 | 34 | steel | L42 |
| | | Reinforcing layer 10c | 120 | 36 | nylon | L42 | 120 | 36 | nylon | L42 | 120 | 36 | nylon | L42 | 120 | 36 | nylon | L42 |
| | | 10c-1, 10c-2 | 80, 40 | | | | 80, 40 | | | | 80, 40 | | | | 80, 40 | | | |
| Reinforcing member 8i | | Reinforcing layer 10a | 50 | 36 | nylon | — | 30 | 36 | nylon | L42 | 40 | 36 | nylon | L42 | — | — | — | L42 |
| | | Reinforcing layer 10b | 60 | 36 | nylon | — | 40 | 36 | nylon | L42 | 50 | 36 | nylon | L42 | 60 | 36 | nylon | L42 |
| | | Reinforcing layer 10c | 120 | 36 | nylon | L42 | 100 | 36 | nylon | L42 | — | — | — | L42 | 100 | 36 | nylon | L42 |
| | | 10c-1, 10c-2 | 80, 40 | | | | 60, 40 | | | | | | | | 60, 40 | | | |
| Evaluation of tire properties | | | | | | | | | | | | | | | | | | |
| Cornering property (CF) | | | 99 | | | | 102 | | | | 101 | | | | 105 | | | |
| Stability in braking | | | +5 | | | | +2 | | | | +1 | | | | +3 | | | |

(Note)
A: width of reinforcing layer (mm), B: end count (cords/50 mm), C: kind of cord, D: extending angle of cord (°)
[L42] in D column: 42° upward to the left, [R42] in D column: 42° upward to the right an inner end of each sidewall portion in the radial direction, a carcass reinforcing these portions, and a reinforcing member comprised of at least one rubberized cord reinforcing layer arranged in a tire zone including at least each of the sidewall portions and extending from each bead portion to a radial height substantially greater than the radial height of the flange of the rim on which the tire is mounted;

wherein a shearing rigidity of the reinforcing member in the circumferential direction, which serves to apply a braking force to the tire, arranged in the same tire at a posture of the mounted tire onto the vehicle is made larger at a first tire zone located at an outside of the vehicle than at a second tire zone located at an inside of the vehicle among the above tire zones; and wherein the pair of mounted tires left- and right-wheeled tires symmetrically located at both sides of the vehicle with respect to a center line of the vehicle in a widthwise direction and the pair of mounted tires are constructed so that the reinforcing members arranged in the first and second tire zones are symmetrical with RESPECT to the center line in both tires.

2. The pair of mounted pneumatic tires according to claim 1, wherein for each mounted tire, at least one of the number, width, cord stiffness and end count in the cord reinforcing layer of the reinforcing member arranged in the first tire zone is made larger than the respective one in the cord reinforcing layer as the reinforcing member arranged in the second tire zone in the same tire.

3. The pair of mounted pneumatic tires according to claim 2, where the reinforcing member for each mounted tire is comprised of plural reinforcing layers, cords of which layers being crossed with each other.

4. The pair of mounted pneumatic tires according to claim 3, wherein for each mounted tire at least one of the reinforcing layers constituting the reinforcing member is a turn-up reinforcing layer wound around a bead core embedded in the bead portion from an inside toward outside in a widthwise direction of the tire.

5. The pair of mounted pneumatic tires according to claim 4, wherein for each mounted tire, the reinforcing layers are arranged so as to cross cord of the reinforcing layers with each other in portions other than a turnup portion of the turn-up reinforcing layer turned outward in the widthwise direction of the tire.

6. A pair of mounted pneumatic tires according to claim 1, wherein the reinforcing member of each tire comprises a plurality of cross cord reinforcing layers, and wherein a cord extending direction of at least one of a reinforcing layer located at an innermost side in the widthwise direction of the tire and a width-widest reinforcing layer among the plural reinforcing layers constituting the reinforcing member is upward to the right in the left-wheeled tire and the upward to the left in the right-wheeled tire as the reinforcing members arranged in the first and second tire zones viewing a plan of the tire mounted onto the vehicle at its phantom developed state from a ground contact side of the tread portion when a forward running direction of the vehicle is upward.

7. A pneumatic tire according to claim 6, wherein the reinforcing member comprises a plurality of reinforcing layers and at least one of the reinforcing layers is a tun-up reinforcing layer wound around a bead core embedded in the bead portion from an inside toward an outside in a widthwise direction of the tire, and wherein a portion of the turn-up reinforcing layer located at the innermost side in the widthwise direction of the tire is the innermost reinforcing layer.

8. The pair of mounted pneumatic tires according to claim 1, wherein each mounted tire includes a bead core and a bead filler radially outward of the bead core, and the reinforcing member arranged in the first tire zone extends radially outwardly beyond the bead filler.

* * * * *